United States Patent
Manamohan et al.

(10) Patent No.: US 11,748,337 B2
(45) Date of Patent: *Sep. 5, 2023

(54) SYSTEM AND METHOD OF DECENTRALIZED MANAGEMENT OF MULTI-OWNER NODES USING BLOCKCHAIN

(71) Applicant: HEWLETT PACKARD ENTERPRISE DEVELOPMENT LP, Houston, TX (US)

(72) Inventors: Sathyanarayanan Manamohan, Bangalore (IN); Krishnaprasad Lingadahalli Shastry, Bangalore (IN); Avinash Chandra Pandey, Bangalore (IN); Ravi Sarveswara, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/225,340

(22) Filed: Apr. 8, 2021

(65) Prior Publication Data

US 2021/0224256 A1    Jul. 22, 2021

Related U.S. Application Data

(63) Continuation of application No. 16/171,288, filed on Oct. 25, 2018, now Pat. No. 11,010,370.

(30) Foreign Application Priority Data

Apr. 30, 2018  (IN) .............................. 201841016315

(51) Int. Cl.
*G06F 16/00*        (2019.01)
*G06F 16/23*        (2019.01)
(Continued)

(52) U.S. Cl.
CPC .......... *G06F 16/2379* (2019.01); *G06F 16/27* (2019.01); *G07C 13/00* (2013.01)

(58) Field of Classification Search
CPC .................................................. G06F 16/2379
See application file for complete search history.

(56) References Cited

U.S. PATENT DOCUMENTS 9,413,779 B2   8/2016   Vasseur et al.
9,569,517 B1   2/2017   Smola et al.
(Continued)

FOREIGN PATENT DOCUMENTS

AU    2017100968 A4    9/2017
CN     105488675 A     4/2016
(Continued)

OTHER PUBLICATIONS

Acar et al., "A Survey on Homomorphic Encryption Schemes: Theory and Implementation", ACM Computing Surveys, vol. 51, No. 4, Article 79, Jul. 2018, pp. 79:1-79:35.

(Continued)

*Primary Examiner* — Ajith Jacob
(74) *Attorney, Agent, or Firm* — Hewlett Packard Enterprise Patent Department

(57) ABSTRACT

The disclosure relates to decentralized management of nodes in a blockchain network. Participants may agree to a consensus rules and implement them as smart contracts. For example, one rule may specify that a node will accept a change proposal only when its local policies and/or data allow it to implement the change. A smart contract may implement this rule and deploy it across the blockchain network for each node to follow. Other participants, through their nodes, may propose changes to the blockchain network, and each node may consult its copy of the smart (Continued)

contract to determine whether to vote to approve the change request and apply the change request locally.

20 Claims, 4 Drawing Sheets

(51) Int. Cl.
  *G06F 16/27* (2019.01)
  *G07C 13/00* (2006.01)

(56) References Cited

U.S. PATENT DOCUMENTS

| | | | |
|---|---|---|---|
| 9,633,315 | B2 | 4/2017 | Chapelle et al. |
| 9,779,557 | B2 | 10/2017 | Hauser et al. |
| 9,875,510 | B1 | 1/2018 | Kasper |
| 10,057,243 | B1 | 8/2018 | Kumar et al. |
| 10,360,500 | B2 | 7/2019 | Kabul et al. |
| 10,547,679 | B1 | 1/2020 | Burnett et al. |
| 10,671,435 | B1 | 6/2020 | Gold et al. |
| 11,201,747 | B2 | 12/2021 | Scherrer et al. |
| 11,334,817 | B2 | 5/2022 | Wang et al. |
| 2012/0039473 | A1 | 2/2012 | Gentry et al. |
| 2013/0290223 | A1 | 10/2013 | Chapelle et al. |
| 2015/0324690 | A1 | 11/2015 | Chilimbi et al. |
| 2015/0332283 | A1 | 11/2015 | Witchey |
| 2016/0087854 | A1 | 3/2016 | Jayanti et al. |
| 2016/0217388 | A1 | 7/2016 | Okanohara et al. |
| 2016/0261690 | A1 | 9/2016 | Ford |
| 2016/0335533 | A1 | 11/2016 | Davis et al. |
| 2017/0060988 | A1 | 3/2017 | Kudo et al. |
| 2017/0091397 | A1 | 3/2017 | Shah |
| 2017/0103468 | A1 | 4/2017 | Orsini et al. |
| 2017/0116693 | A1 | 4/2017 | Rae et al. |
| 2017/0134158 | A1 | 5/2017 | Pasol et al. |
| 2017/0140145 | A1 | 5/2017 | Shah |
| 2017/0169358 | A1 | 6/2017 | Choi et al. |
| 2017/0220949 | A1 | 8/2017 | Feng et al. |
| 2017/0272342 | A1 | 9/2017 | Zessin et al. |
| 2017/0279774 | A1 | 9/2017 | Booz et al. |
| 2017/0289111 | A1 | 10/2017 | Voell et al. |
| 2017/0302663 | A1 | 10/2017 | Nainar et al. |
| 2018/0018590 | A1 | 1/2018 | Szeto et al. |
| 2018/0039667 | A1 | 2/2018 | Pierce et al. |
| 2018/0157688 | A1 | 6/2018 | Zessin et al. |
| 2018/0183768 | A1 | 6/2018 | Lobban et al. |
| 2018/0217905 | A1 | 8/2018 | Reza et al. |
| 2018/0247191 | A1 | 8/2018 | Katz et al. |
| 2018/0331897 | A1 | 11/2018 | Zhang et al. |
| 2019/0020629 | A1 | 1/2019 | Baird et al. |
| 2019/0042407 | A1 | 2/2019 | Gao et al. |
| 2019/0089716 | A1 | 3/2019 | Stocker |
| 2019/0138929 | A1 | 5/2019 | Wong et al. |
| 2019/0147532 | A1 | 5/2019 | Singh et al. |
| 2019/0182030 | A1 | 6/2019 | Jo |
| 2019/0182231 | A1 | 6/2019 | Harrer et al. |
| 2019/0287026 | A1 | 9/2019 | Calmon et al. |
| 2019/0295000 | A1 | 9/2019 | Candel et al. |
| 2019/0317934 | A1 | 10/2019 | Jentzsch et al. |
| 2019/0325432 | A1 | 10/2019 | Ow et al. |
| 2019/0332921 | A1 | 10/2019 | Rodriguez |
| 2019/0332955 | A1 | 10/2019 | Manamohan et al. |
| 2019/0332966 | A1 | 10/2019 | Gidney |
| 2019/0347540 | A1 | 11/2019 | Yim et al. |
| 2020/0042362 | A1 | 2/2020 | Cui |
| 2020/0057920 | A1 | 2/2020 | Collins et al. |
| 2020/0193292 | A1 | 6/2020 | Weng et al. |
| 2020/0218940 | A1 | 7/2020 | Anglin et al. |
| 2020/0244435 | A1 | 7/2020 | Shpurov et al. |
| 2020/0348662 | A1 | 11/2020 | Cella et al. |
| 2021/0134095 | A1 | 5/2021 | Milt et al. |
| 2023/0041118 | A1 | 2/2023 | Imabayashi et al. |

FOREIGN PATENT DOCUMENTS

| | | |
|---|---|---|
| CN | 106228446 A | 12/2016 |
| CN | 106445711 A | 2/2017 |
| CN | 106911513 A | 6/2017 |
| CN | 106911513 A | 6/2017 |
| CN | 107103087 A | 8/2017 |
| CN | 107332900 A | 11/2017 |
| CN | 107395349 A | 11/2017 |
| CN | 107395353 A | 11/2017 |
| CN | 107579848 | 1/2018 |
| CN | 107665154 A | 2/2018 |
| CN | 108268638 A | 7/2018 |
| CN | 109033757 A | 12/2018 |
| CN | 109685501 A | 4/2019 |
| CN | 109889326 A | 6/2019 |
| CN | 110428056 A | 11/2019 |
| CN | 110490330 A | 11/2019 |
| EP | 3564873 A1 | 11/2019 |
| WO | 2017/203093 A1 | 11/2017 |
| WO | 2018/059939 A1 | 4/2018 |
| WO | 2018/130267 A1 | 7/2018 |
| WO | 2018/191030 A1 | 10/2018 |

OTHER PUBLICATIONS

Bonawitz et al., "Practical Secure Aggregation for Privacy-Preserving Machine Learning", Cryptology ePrint Archive: Report 2017/281,2017, 21 pages.
Kurakin et al., "Adversarial Examples in the Physical World", CoRR, abs/1607.02533, 2017, pp. 1-14.
Nedic et al., "Network Topology and Communication-Computation Tradeoffs in Decentralized Optimization", Jan. 15, 2018, 32 pages.
Shokri et al., "Membership Inference Attacks Against Machine Learning Models", CoRR, abs/1610.05820, 2017, 16 pages.
Yuan et al., "Privacy Preserving Back-Propagation Neural Network Learning Made Practical with Cloud Computing", IEEE Transactions on Parallel and Distributed Systems, 2013, vol. 25, pp. 1-11.
Cheung, et, al., "Distributed Machine learning white paper," 2017. (Year 2017).
M. Shen, X. Tang, L. Zhu, X. Du and M. Guizani, "Privacy-Preserving Support Vector Machine Training Over Blockchain-Based Encrypted IoT Data in Smart Cities," in IEEE Internet of Things Journal, vol. 6, No. 5, pp. 7702-7712, Oct. 2019, doi: 10.1109/JIOT.2019.2901840. (Year: 2019).
Abadi et al., "TensorFlow: A System for Large-Scale Machine Learning", 2th USENIX Symposium on Operating Systems Design and Implementation (OSDI '16), Nov. 2-4, 2016, 21 pages.
Ali et al., "Applications of Blockchains in the Internet of Things: A Comprehensive Survey", IEEE Communications Surveys & Tutorials, vol. 21, No. 2, Second Quarter 2019, pp. 1676-1717.
Bank for International Settlements, "Distributed ledger technology in payment, clearing and settlement", Committee on Payments and Market Infrastructures, Feb. 2017, 29 pages.
Ben Dickson, "The case for decentralized artificial intelligence", TechTalks, available online at <https://bdtechtalks.com/2018/01/10/decentralized-ai-blockchain/>, Jan. 10, 2018, 5 pages.
Bonawitz et al., "Practical Secure Aggregation for Privacy-Preserving Machine Learning", CCS'17, ACM, Oct. 30-Nov. 3, 2017, pp. 1175-1191.
Catherine Sturman, "Owkin is set to use machine learning to augment medical and biology research", Healthcare Global, available online at <https://www.healthcareglobal.com/technology/owkin-set-use-machine-learning-augment-medical-and-biology-research>, Jun. 19, 2018, 8 pages.
Chen et al., "Algorand", Computer Science Cryptography and Security, May 26, 2017, pp. 1-75.
Chen et al., "When Machine Learning Meets Blockchain: A Decentralized, Privacy-preserving and Secure Design", IEEE International Conference on Big Data (Big Data), 2018, pp. 1178-1187.
Fred Ehrsam, "Blockchain-based Machine Learning Marketplaces", Medium, available online at <https://medium.com/@FEhrsam/blockchain-based-machine-learning-marketplaces-cb2d4dae2c17>, Mar. 13, 2018, 10 pages.

(56) References Cited

OTHER PUBLICATIONS

Georgopoulos et al., "Distributed machine learning in networks by consensus", Neurocomputing, Elsevier, vol. 124, 2013, 11 pages.
Kim et al., "On-Device Federated Learning via Blockchain and its Latency Analysis", Research Gate, Aug. 2018, 4 pages.
Kurtulmus et al., "Trustless Machine Learning Contracts; Evaluating and Exchanging Machine Learning Models on the Ethereum Blockchain", Research Gate, Feb. 27, 2018, 11 pages.
Lei Shi, "The convergence of AI and IoT, are we there yet?", available online at <https://northstream.se/insights/blog/the-convergence-of-ai-and-iot-are-we-there-yet/>, Oct. 11, 2017, 11 pages.
Li et al., "Scaling Distributed Machine Learning with the Parameter Server", 11th USENIX Symposium on Operating Systems Design and Implementation, Oct. 6-8, 2014, 17 pages.
Mendis et al., "Blockchain as a Service: An Autonomous, Privacy Preserving, Decentralized Architecture for Deep Learning", Research Paper, Jul. 5, 2018, pp. 1-8.
Nakamoto et al., "Bitcoin: A Peer-to-Peer Electronic Cash System", Oct. 31, 2008, pp. 1-9.
Pop at al., "Blockchain Based Decentralized Management of Demand Response Programs in Smart Energy Grids", MDPI, Jan. 9, 2018, pp. 1-21.
Sandha et al., "In-database Distributed Machine Learning: Demonstration Using Teradata SQL Engine," Proceedings of the VLDB Endowment, vol. 12, No. 12., Aug. 2019, pp. 1854-1857.
Search Report and Written Opinion received for PCT Application No. PCT/US2020/019064, dated Jun. 2, 2020, 15 pages.
Singla et al., "Machine Learning for Secure Device Personalization Using Blockchain", IEEE, Sep. 19, 2018, 7 pages.
Venkataraman et al., "Adopting blockchain for enterprise asset management (EAM)", IBM, available online at <https://developer.ibm.com/technologies/blockchain/tutorials/cl-adopting-blockchain-for-enterprise-asset-management-earn/>, Mar. 17, 2017, 15 pages.
Verbraeken et al., A Survey on Distributed Machine Learning, (Research Paper), ACM Computing Surveys, vol. 53, No. 2, Mar. 2020, pp. 1-33.
Weng et al., "DeepChain: Auditable and Privacy-Preserving Deep Learning with Blockchain-based Incentive", Journal of Latex Class Files, vol. 14(8), Nov. 2019, pp. 1-18.
Zhang et al., "Stay Fresh: Speculative Synchronization for Fast Distributed Machine Learning", 2018 IEEE 38th International Conference on Distributed Computing Systems (ICDCS), 2018, 11 pages.
Yuguang, Y. et al., "Review and Research for Consensus Mechanism of Block Chain," Apr. 5, 2018, Journal of Information Security Research 4.4, pp. 369-379.
Search Report and Written Opinion received for PCT Application No. PCT/US2021/014932, dated May 13, 2021, 8 pages.
Search Report and Written Opinion received for PCT Application No. PCT/US2021/013394, dated Apr. 19, 2021, 8 pages.
Kate et al., "Distributed Key Generation in the Wild", Report 2012/377, 2012, pp. 1-30.
"Decentralized Machine Learning White Paper", available online at <www.decentralizedml.com>, Dec. 31, 2017, 58 pages.
Diro et al., "Deep Learning: The Frontier for Distributed Attack Detention in Fog-to-Things Computing", IEEE Communications Magazine, Feb. 2018, , pp. 169-175.
Watanabe et al., "Blockchain contract: A complete consensus using blockchain," 2015 IEEE 4th Global Conference on Consumer Electronics (GCCE), 2015, pp. 577-578, doi: 10.1109/GCCE.2015.7398721. (Year: 2015).
Yang et al. "Federated Machine Learning: Concept and Applications." arXiv preprint arXiv:1902.04885 (2019). (Year: 2019).
Reisizadeh et al., "Robust and Communication-Efficient Collaborative Learning", Oct. 31, 2019, 33 pages.
European Search Report and Search Opinion received for EP Application No. 21747157.2, dated Oct. 28, 2022, 5 pages.
Li et al., "DLBC: A Deep Learning-Based Consensus in Blockchains for Deep Learning Services", IEEE Transactions On Services Computing, Jan. 31, 2020, 13 pages.
Lihu et al., "A Proof of Useful Work for Artificial Intelligence on the Blockchain", Jan. 25, 2020, 25 pages.
Teerapittayanon et al., "DaiMoN: A Decentralized Artificial Intelligence Model Network", Jul. 2019, 8 pages.
Castro et al, "Practical Byzantine Fault Tolerance", Proceedings of the Third Symposium on Operating Systems Design and Implementation, New Orleans, USA, Feb. 1999 (Year: 1999).
Chen et al, "On Security Analysis of Proof-of-Elapsed-Time (PoET)", In: Spirakis, P., Tsigas, P. (eds) Stabilization, Safety, and Security of Distributed Systems. SSS 2017. Lecture Notes in Computer Science(), vol. 10616. Springer, Cham, https://doi.org/10.1007/978-3-319-69084-1_19 (Year: 2017).
Feng et al, "Scalable Dynamic Multi-Agent Practical Byzantine Fault-Tolerant Consensus in Permissioned Blockchain". Appl. Sci. 2018, 8, 1919. https://doi.org/10.3390/app8101919 (Year: 2018).
Nguyen et al, "A Survey about Consensus Algorithms Used in Blockchain", J Inf Process Syst, vol. 14, No. 1, pp. 101-128, Feb. 2018 https://doi.org/10.3745/JIPS.01.0024 (Year: 2018).
Resizadeh, et al., "Quantized Decentralized Consensus Optimization"; 2018 IEEE Conference on Decision and Control (CDC) (Year: 2018).
Zhu, et al., Blockchain-Based Privacy Preserving Deep Learning. In: Guo, F., Huang, X., Yung, M. (eds) Information Security and Cryptology. Inscrypt 2018. Lecture Notes in Computer Science(), vol. 1144 (Year: 2018).

SYSTEM AND METHOD OF DECENTRALIZED MANAGEMENT OF MULTI-OWNER NODES USING BLOCKCHAIN

CROSS REFERENCE TO RELATED APPLICATIONS

The present application is a continuation of U.S. patent application Ser. No. 16/171,288, filed on Oct. 25, 2019, which claims the benefit of Indian Patent Application No. 201841016315, filed on Apr. 30, 2018, which is related to co-pending and co-owned Indian Patent Application No. 201841016311, filed on Apr. 30, 2018, which are hereby incorporated by reference herein in their entirety.

DESCRIPTION OF THE RELATED ART

Management of geo-distributed decentralized infrastructures like smart cities (having connected devices), factory floors, cluster of geographically distributed servers, autonomous vehicles etc. is an unsolved problem. These systems are massive in scale, decentralized, and heterogeneous in nature. In these and other systems, there may be multiple stakeholders such as owners of devices that do not necessarily trust each other, but still wish to collaboratively make decisions for efficiency. Because of their geo-distribution and multi-owner properties, these systems can be administered only on an open (public) network. Management operations on public network opens up a new attack surface that regular management solutions are not designed to handle.

Furthermore, these systems do not have mechanism to derive a single version of truth about state of the system since the system is fragmented and is present in individual management domains. Also nodes and software (such as firmware, operating systems, etc.) cannot be fully trusted, since there is no authoritative version of state that can be used by every entity to classify a node as compliant or non-compliant. Non-compliant systems pose the risk of compromising the entire network.

BRIEF SUMMARY OF THE DISCLOSURE

According to various embodiments of the disclosed technology, a blockchain platform may be used for decentralized management of nodes in a blockchain network. The nodes may be owned or operated by different entities, who may not otherwise trust one another. For example, a node may enroll with the blockchain network to participate in management of the blockchain network. Each node may propose a change request relating to a management operation or other request. The change request may be broadcast to the blockchain network such as via a blockchain transaction. In some examples, the transaction may be written to a distributed ledger. Other nodes may obtain the change request from the transaction and/or the distributed ledger.

At least some of the nodes in the blockchain network may each vote on whether to approve the change request based on one or more local policy rules. Each voting node may broadcast its vote to the blockchain network. A consensus determination may be made on whether the change request is approved based on the votes. For example, the consensus decision may be based on a rule encoded by a smart contract that indicates a proportion of votes needed to implement the change request. If a consensus decision to implement the change request is made, then the nodes in the blockchain network may implement the change request and broadcast its state indicating such implementation to the blockchain node, whether via transaction or entry in the distributed ledger.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

The disclosure relates to decentralized management of nodes in a blockchain network. Participants may agree to consensus rules and implement them as smart contracts. For example, one rule may specify that a node will accept a change proposal only when its local policies and/or data allow it to implement the change. A smart contract may implement this rule and deploy it across the blockchain network for each node to follow. Other participants, through their nodes, may propose changes to the blockchain network, and each node may consult its copy of the smart contract to determine whether to vote to approve the change request and apply the change request locally.

Once a change request is accepted by a consensus vote, guided by the smart contract, each of the systems implement the change and there is a clear record and undisputable record of state of the system as it progressed and evolved over time due to change requests that were made by one node and applied by the other nodes in the blockchain network. The system is scalable since it leverages blockchain's peer-to-peer and decentralized nature. Absence of a central entity also eliminates single points of failures and makes it harder to attack due to its distributed nature. The blockchain network also supports heterogeneous infrastructure—so long as a computer node can adhere to the smart contracts and logic of the blockchain network, it can participate. The system also permits a single version of truth of the state of the system since the distributed ledger is immutable.

The system may be used in various ways by participants that wish to create self-enforcing and decentralized ways to propose changes to the network. For example, participants may include entities such as banking institutions that wish to form a self-enforcing network of banks that may not otherwise trust one another. Participants may also include device manufacturers that wish to manage devices in a decentralized manner so that software and other updates to devices can be proposed by one participant and accepted and implemented by others. Other types of participants may use the system for other purposes as well.

Figure 1:
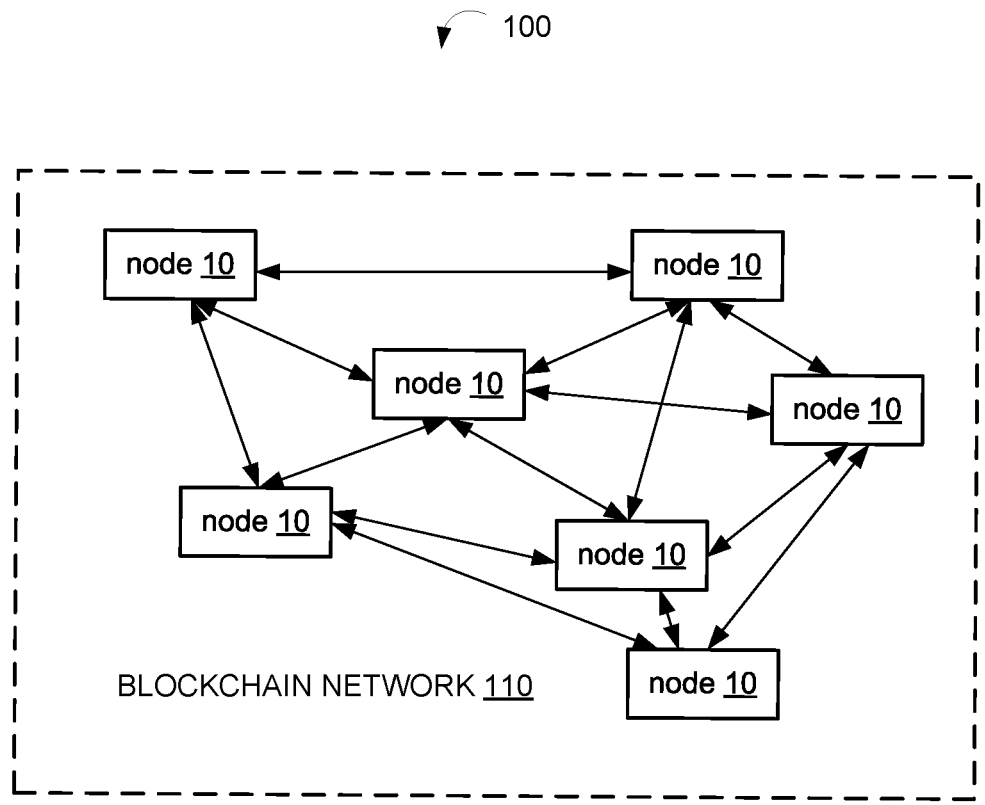
FIG. 1 illustrates an example of a system of decentralized management of nodes under the control of different entities, according to an implementation of the invention.

FIG. 1 illustrates an example of a system 100 of decentralized management of device assets outside a computer network 102, according to an implementation of the invention. System 100 may include a blockchain network 110. The blockchain network 110 may include a plurality of nodes that are connected to one another using one or more connection protocols, including a peer-to-peer connection protocol. The particular number of, configuration of, and connections between the nodes 10 may vary. As such, the arrangement of the nodes 10 shown in FIG. 1 is for illustrative purposes only.

Figure 2:
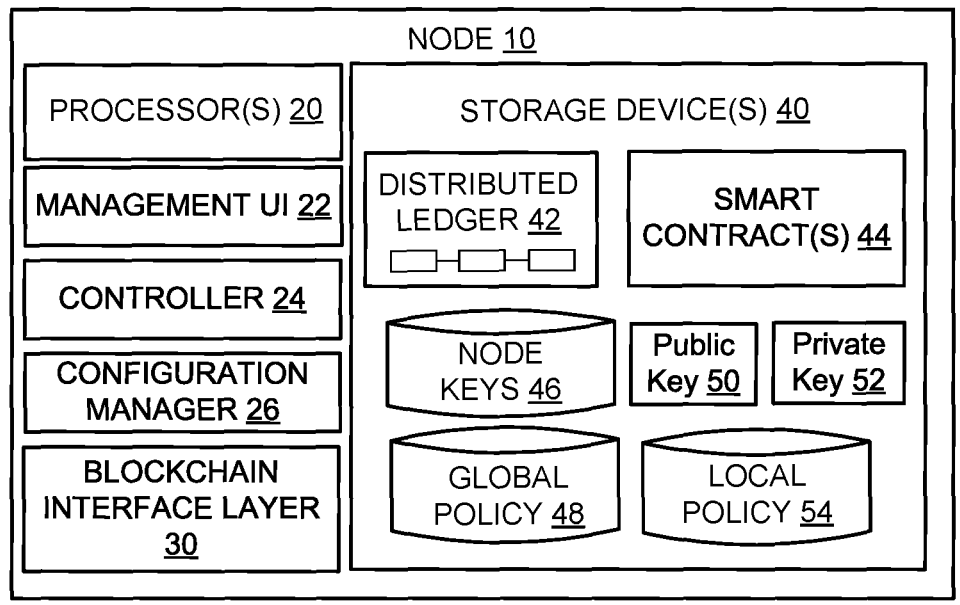
FIG. 2 illustrates an example of a node in a blockchain network for decentralized management of nodes under the control of different entities, according to an implementation of the invention.

Examples of further details of a node 10 will now be described with reference to FIG. 2. The node 10 may include one or more processors 20 (also interchangeably referred to herein as processors 20, processor(s) 20, or processor 20 for convenience), one or more storage devices 40, and/or other components. The processor 20 may be programmed by one or more computer program instructions. For example, the processor 20 may be programmed to execute a management user interface 22 (illustrated as "management UI 22"), a controller 24, a configuration manager 26, a blockchain interface layer 30, and/or other instructions to perform various operations, each of which are described in greater detail herein. As used herein, for convenience, the various instructions will be described as performing an operation, when, in fact, the various instructions program the processors 20 (and therefore node 10) to perform the operation.

The management UI 22 may provide an interface, such as a graphical user interface, a command line interface, and/or other type of interface configured to receive management option inputs. For instance, a user such as a system administrator may use the management UI 22 to input management operations to propose as a change request to other nodes 10 of the blockchain network 110, or to input an edge node to be added. In this manner, the user may manage nodes 10 based on change requests originating from within the computer network 102.

The controller 24 may obtain management operations to be performed and may communicate them to other nodes 10. The management operations may be obtained from the management UI 22 and/or a global policy database 48. Controller 24 may communicate the management operations using the blockchain interface layer 30. For example, the controller 24 may write the management operations into a blockchain transaction that is broadcast to the nodes 10. The blockchain transaction may be broadcast using a multicast protocol to several or all nodes 10. In some instances, the blockchain transaction may be broadcast using peer-to-peer networking in which the node 10 acts as a peer to broadcast the transaction to at least one other peer (in this case, another node 10), which broadcasts the transaction to other peers and so on. In some implementations, the controller 24 may wait until a blockchain transaction is signed by a node 10 as described herein before writing the transaction to a block (also referred to as a "ledger block") of the distributed ledger 42. In these implementations, the nodes 10 may obtain management operations directly from the broadcasted transaction. In other implementations, the controller 24 may write the transaction to a block of the distributed ledger 42. In these implementations, the nodes 10 may obtain management operations by obtaining the current (in other words latest) block that references transactions having management operations.

In whichever manner the controller 24 broadcasts the management operations to other nodes 10 using the blockchain interface layer 30, the controller may do so in a manner that is directed to all other nodes 10. For example, a management operation of "check status" may be directed to all nodes of the blockchain network 110 so that each edge node is instructed to perform a status check. Each edge node 10 will then perform the status check and broadcast its state indicating the results of the status check (or other management operation as described below).

In some instances, the controller 24 may target one or more other nodes 10 to receive a management operation. In these implementations, the controller 24 may generate a blockchain transaction and/or a block on the distributed ledger 42 directed to the targeted other node(s) 10. For instance, the controller 42 may encode an identifier of the node 10 that is targeted. Alternatively or additionally, the controller may encode a device type that targets certain types of nodes 10 that should perform management operations. Still other examples include locations that should be targeted such that other nodes in certain geolocations are targeted. The smart contracts 44 may include rules, which each node 10 follows, that direct the nodes to inspect transactions and/or blocks to determine whether it should apply a management operation contained in the transaction and/or block. In some implementations, the controller 24 may encrypt the management operation to be performed with a target node's 10 public key such that only the target node can decrypt the management operation with its private key.

In some instances, certain management operations may be executed periodically without user intervention. For example, controller 24 may execute a daemon or other process that periodically causes a status check from all other nodes 10 to be executed. This daemon may periodically generate relevant change requests, which are issued to the other nodes 10—and tracked via—the distributed ledger 42.

In an implementation, the controller 24 may enforce global policy 48 by ensuring that the state of the network complies with the global policy. For instance, the controller 24 may periodically obtain the current system state from the distributed ledger 42. As noted elsewhere, state transitions of the nodes 10 may be recorded on the distributed ledger 42. Alternatively or additionally, the result of status checks may be written to the distributed ledger 42, indicating the current state of the system. The controller 24 may compare the current system state with the global policy 48. Any discrepancies may be noted and a node 10 in non-compliance may be targeted for executing a management operation that will resolve the non-compliance. In some instances, the smart contracts 44 and/or global policy 48 may encode rules that specify when a non-complying node 10 should be taken offline. For instance, the rules may specify a node 10 that continues to be in non-compliance after N number of blocks have been written to the distributed ledger 42 should be taken offline. Other parameters may specify such removal as well. The foregoing may ensure recurring policy enforcement and compliance using the blockchain interface 30. It should be noted that, in some implementations, any node 10 may enforce this global policy since the relevant stakeholders have agreed to such policy. Thus, the blockchain network 110 may be a self-enforcing system in which each node 10 may enforce a global policy.

In an implementation, in connection with certain types of management operations, the controller 24 may make available files for download. For instance, operating system images, software updates, new software, and/or other downloadable files or data may be made available for other nodes 10 to download in connection with a management operation. This may ensure that the distributed ledger 42 itself does not have to store such files or data but stores an immutable record of current files or data that should be used (as well as historic listing of such files or data).

The configuration manager 26 may obtain one or more inbound management operations from the blockchain interface layer 30. The inbound management operation differs from the outbound management operation previously described in that the inbound management operation is provided from another node 10 and is evaluated at a receiving node. As such, a given node 10 can proposed management operations for other nodes and can also receive management operations proposed by other nodes.

The configuration manager 26 may apply the one or more inbound management operations to the node 10. In some instances, the configuration manager 26 may apply the inbound management operations without a determination of whether to do so. In other instances, the configuration manager 26 may consult one or more local policies to ensure that the node 10 can comply with the one or more inbound management operations. The local policies may be encoded by the smart contracts 44. Alternatively or additionally, some local policies may be stored in a local policy 54, which is not necessarily shared with other edge nodes 10. In other words local policy 54 may be defined specifically at a node at which it is stored.

Once the configuration manager 26 has acted on the one or more inbound management operations (whether by applying them or not), the configuration manager 26 may broadcast its state to other nodes of the blockchain network 110. For example, the configuration manager 26 may generate and transmit a blockchain transaction that indicates the state of the node 10 (such as whether, how, and/or when the one or more management operations have been applied). The blockchain transaction may include information identifying the management operation was (or was not) performed. For example, the information identifying the management operation may be a block identifier (such as a block hash) that identifies the block from which the management operations was obtained. In this manner, the blockchain transaction indicating a node's state may record the inbound management operation that was (or was not) applied.

For implementations in which management operations are targeted to a node 10 and encrypted using the targeted node 10's public key 50, the blockchain agent 52 may decrypt the management operations using the edge node 10's private key 52. In some implementations, the configuration manager 26 may digitally sign a blockchain transaction from the node 10 that proposed the management operation. For instance, the proposing node 10 may generate a transaction directed to the targeted node 10 and sign the transaction using the proposing node 10's public key.

The proposing node 10 may then write the signed transaction to the distributed ledger 42 to create an immutable record of the management operation and state change of the targeted node. In this manner, the transaction may be securely proven to have been executed by the targeted node 10. It should be noted that the targeted node 10 need not specifically be targeted in order to sign the transaction so as to create a record of the targeted node's state in a transaction and therefore block.

Upon receipt of a transaction, the targeted node 10 may apply the management operation and indicate that it has successfully done so (or failed to do so) by signing the transaction with the targeted node's private key 52. The proposing node 10 or the targeted node 10 may write this transaction into the distributed ledger 42, creating a secure, immutable record that proves that the targeted node received and applied the management operation. In some implementations, a node 10 may be associated with a series of transactions such that each transaction may refer to a previous transaction hash of that node. The transactions may be written to the distributed ledger 42 by the node 10 (or other node 10 in a competitive manner in which the longest chain rule or other blockchain rule may apply), creating an immutable and historic record of transactions for a given node 10.

In an implementation, the configuration manager 26 may periodically ensure compliance with the current state of the system. For instance, the smart contracts 44 may encode rules that specify what events trigger such checking. The events may include a restart, a new initialization, a passage of a period of time, a number of blocks written to the distributed ledger 42, a security event such as detection of malware, an input from a user specifying that the check should occur, and/or other event that can trigger compliance evaluation. To evaluate compliance, the configuration manager 26 may determine whether any current management operations (as defined by the latest block encoding such operations), including global ones and those specifically targeted to a node 10. If so, the configuration manager 26 may determine whether they should have been but were not implemented. If not, the configuration manager 26 may implement the management operations. In this manner, the nodes 10 may self-enforce the current management operations (as defined by the current system state).

The blockchain interface layer 30 may be used to interface with the distributed ledger 42 in accordance with the smart contracts 44. The blockchain interface layer 30 is described with reference to FIG. 3 below.

The storage devices 40 may store a distributed ledger 42, smart contracts 44, node keys 46, the global policy 48, a node's public key 50, a node's private key 52, a local policy 54, and/or other data. The distributed ledger 42 may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. The distributed ledger 42 may store blocks that indicate a state of an edge node 10 relating to its configuration or other management information.

The smart contracts 44 may include rules that configure nodes to behave in certain ways in relation to decentralized management of edge nodes. For example, the rules may specify deterministic state transitions, which nodes may enroll to participate in decentralized management, rules for implementing a change request issued by a node 10, and/or other actions that a node 10 may take for decentralized management.

The node keys 46 may store public encryption keys of other nodes 10 in association with their identifies (such as Internet Protocol or other addresses and/or identifying information). In this manner, in some implementations, change requests may be targeted to specific nodes 10 and encrypted using the target node's public key.

The global policy 48 may store a security or other policy for the system. The global policy 48 may include, for example, network configuration settings, security configuration settings, operating system settings, application settings, policy rules, and/or other policy information for nodes 10 in the blockchain network 110.

Figure 3:
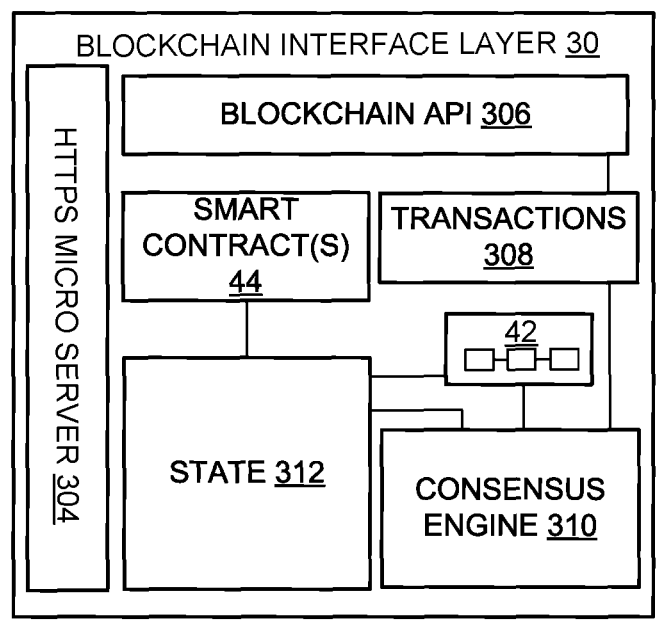
FIG. 3 illustrates an example of a blockchain interface layer for decentralized management of nodes under the control of different entities, according to an implementation of the invention.

Reference will now be made to FIG. 3, which illustrates an example of the interface layer 30. Each of the nodes 10 may implement the interface layer 30. The interface layer 30 may include a messaging interface used to communicate with the blockchain network 110. The messaging interface may be configured as a Secure Hypertext Transmission Protocol ("HTTPS") microserver 304. Other types of messaging interfaces may be used as well. The interface layer 30 may use a blockchain API 306 to make calls for blockchain functions based on a blockchain specification. Examples of blockchain functions include, but are not limited to, reading and writing blockchain transactions 308 and reading and writing blockchain blocks to the distributed ledger 42. One example of a blockchain specification is the Ethereum specification. Other blockchain specifications may be used as well.

Consensus engine 310 may include functions that make consensus decisions, such as whether to enroll a node to participate in decentralized management of the nodes.

Figure 4:
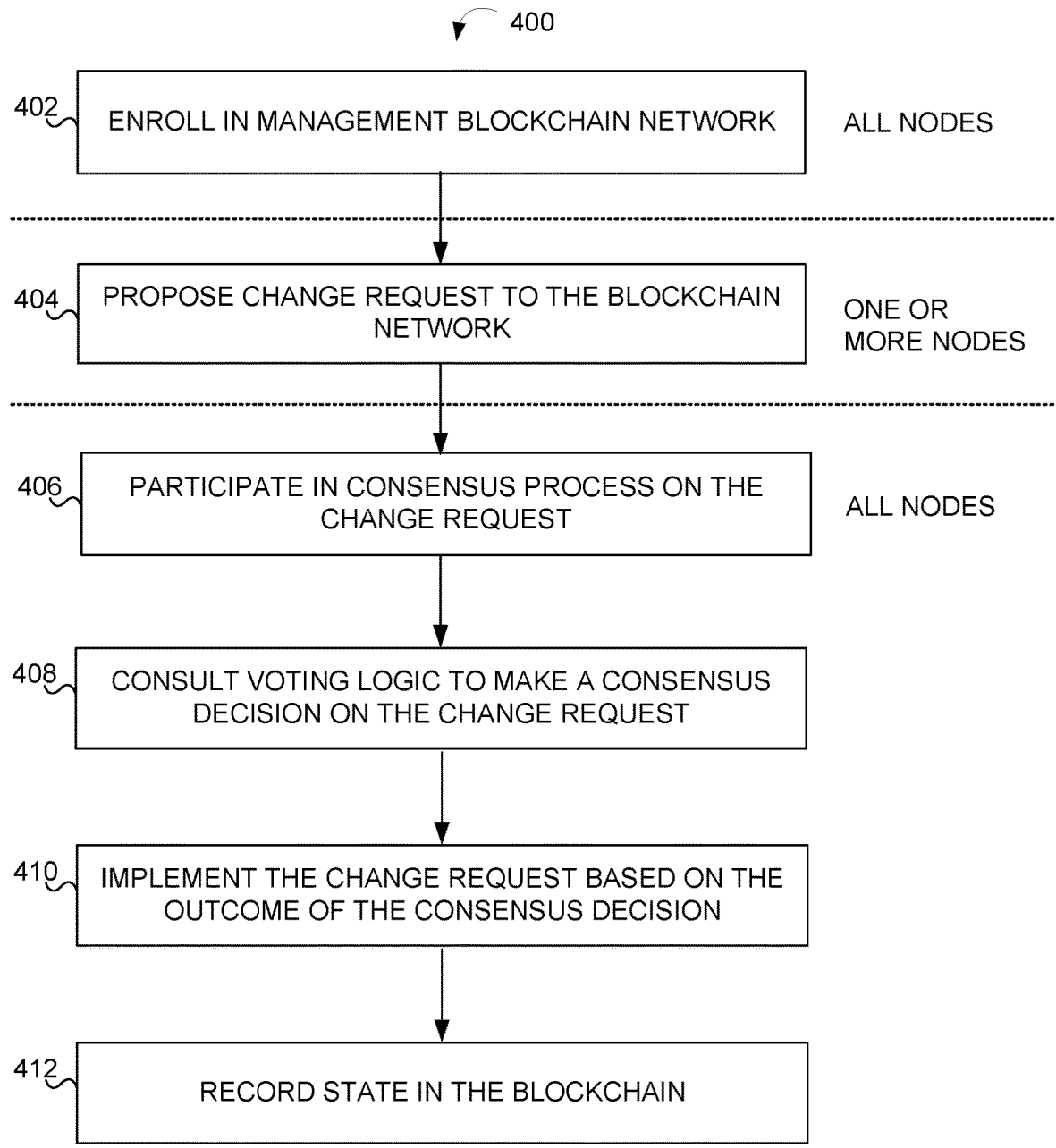
FIG. 4 illustrates an example of a process of decentralized management of nodes under the control of different entities, according to an implementation of the invention.

Reference will now be made to FIG. 4, which illustrates an example of a process 400 of decentralized management of nodes under the control of different entities.

In an operation 402, each node 10 may enroll to participate in decentralized management of the blockchain network 110. Such enrollment may be conditioned on having permission to participate, which may include a requirement that the smart contracts 44 and the node 10 meets the functionality of the controller 24, configuration manager 26, blockchain interface layer 30, and/or other functions of a node 10 specified herein. For example, if a banking institution wishes to join the blockchain network 110, it must program its computers to act as a node 10 as specified by the programs and smart contracts 44 described herein. Likewise, an autonomous vehicle or other apparatus that wishes to join the blockchain network 110 must be programmed to behave as a node 10.

In an operation 404, any one or more of the enrolled nodes 10 may propose a change request to the blockchain network. For example, a node 10 may write a blockchain block to the distributed ledger 42 with the change request. Alternatively, the node 10 may broadcast the change request in a peer-to-peer manner to other nodes 10 of the blockchain network 110. For instance, the node 10 may generate and broadcast a blockchain transaction with the change request.

In an operation 406, all enrolled nodes 10 (or at least a minimum number of nodes specified by the smart contracts 44) may participate in a consensus process to determine whether to approve the change request. The consensus process may include a voting process in which at least some of the nodes 10 vote to determine whether to accept the change proposal. In some instances, each node 10 may consult its copy of the smart contracts 44, which may specify voting logic. For instance, the voting logic may specify that a node should vote to deny the change request if local rules and/or data prohibit its implementation. The node may apply its local policy and/or data locally accessible to it to determine whether to vote to approve or deny the change proposal. For instance, if the local policy of a node does not permit the change request to be applied to the node or other nodes, the node may vote to deny the change proposal. In some implementations, each enrolled node may have an equal voting power. In other implementations, some nodes may have more voting power while others have less. Such disparity may be represented as weights assigned to a given node that either increases or decreases the voting power of the node. Each node 10 may generate and transmit a blockchain transaction that specifies its vote to the blockchain network 110.

In an operation 408, each node may consult voting logic, such as voting logic stored in the smart contracts 44, to make (in other words, participate in) a consensus decision on the change request. The voting logic on a consensus level may require that a certain number or percentage of nodes must approve the change request in order to come to a consensus decision to approve it. This number or percentage may take into account any voting weights of a voting node.

The consensus decision may be determined by one or more miner nodes that collect the votes of each voting node 10. The miner nodes may be among the voting nodes 10, and may be elected to be mining nodes or be selected based on rules specified in the smart contracts 44. For example, each voting node 10 may generate a blockchain transaction indicating its vote. The miner nodes may collect the transactions and tabulate them into a consensus decision. The miner nodes may generate a block that specifies the consensus decision (or merely includes the transactions that specifies the votes such that every other node can calculate the consensus decision deterministically based on the smart contract 44). It should be noted that each change request may be assigned with a globally unique identifier generated by the requesting node and this identifier may be used to associate corresponding votes and consensus decision. The block may be mined into the distributed ledger 42.

In some implementations, the consensus decision may be made by each individual node by collecting all the votes from all voting nodes (such as by collecting all the transactions from each voting node). Because each node is programmed in the same with and each node is governed by the same smart contracts, each can deterministically generate a consensus decision.

In an operation 410, each node 10 may implement the change request depending on the outcome of the consensus decision. Each node 10 may obtain the consensus decision (or transactions indicating the votes) from its local copy of the distributed ledger 42. For example, if the consensus decision is approved, each node may be programmed to implement the change request in accordance with the smart contracts 44 that automatically enforce such decisions.

In an operation 412, upon implementing the change request, each node may record its state into the distributed ledger 42. In this manner, an immutable record of the consensus decision and corresponding implementation of the change request may be made. The system permits the participants know the full state of the system from their local copy of the distributed ledger 42. This allow a node to take globally valid decisions based on local data since the distributed ledger 42 provides a "single version of truth" of the state to all nodes.

Figure 5:
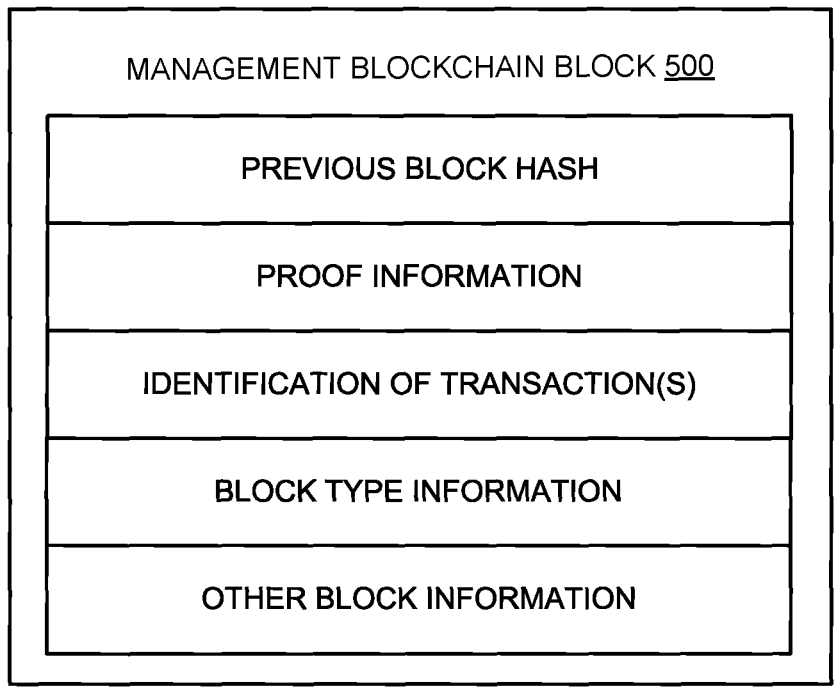
FIG. 5 a block entry in a distributed ledger that includes transaction information for decentralized management of nodes under the control of different entities, according to an implementation of the invention.

FIG. 5 illustrates an example of a blockchain block 500 (also referred to as "block 500"), according to an implementation of the invention. The particular format and configuration of block 500 may be dependent on the blockchain platform used to implement the blockchain network 110. The management node may write transactions to block 500, which is added to distributed ledger 42. The transactions may be submitted by nodes 10 in order to broadcast status information to the blockchain network 110. A node 10 may also submit transactions to propose management operations to be adopted by the network and performed at other nodes 10.

The block 500 may include a payload comprising a previous block hash, proof information, identification of transactions, block type information, and/or other block information. The previous block hash may include a value of a hash of a previous block. As such, the block 500 may be linked to another (previous) block in the distributed ledger 42. The proof information may include a proof of stake or proof of work, depending on which type of blockchain is implemented. For proof of stake implementations, the proof information may include evidence that a node that generated the block 500 is a management node. Such information may include node credential information (such as an identifier) and/or other information that indicates a proof of stake of the management node. In proof of work implementations, the proof information may indicate a hash value or other challenge response from the management node 12 that indicates that the management node actually performed work required to write the block 500. The transaction data—and the block 500—may be used to coordinate decentralized machine learning across nodes 10. The transaction data may include an identification of transactions associated with the block 500. This is because each node 10 may have a copy of the distributed ledger 42 and is able to monitor the state of the system.

Figure 6:
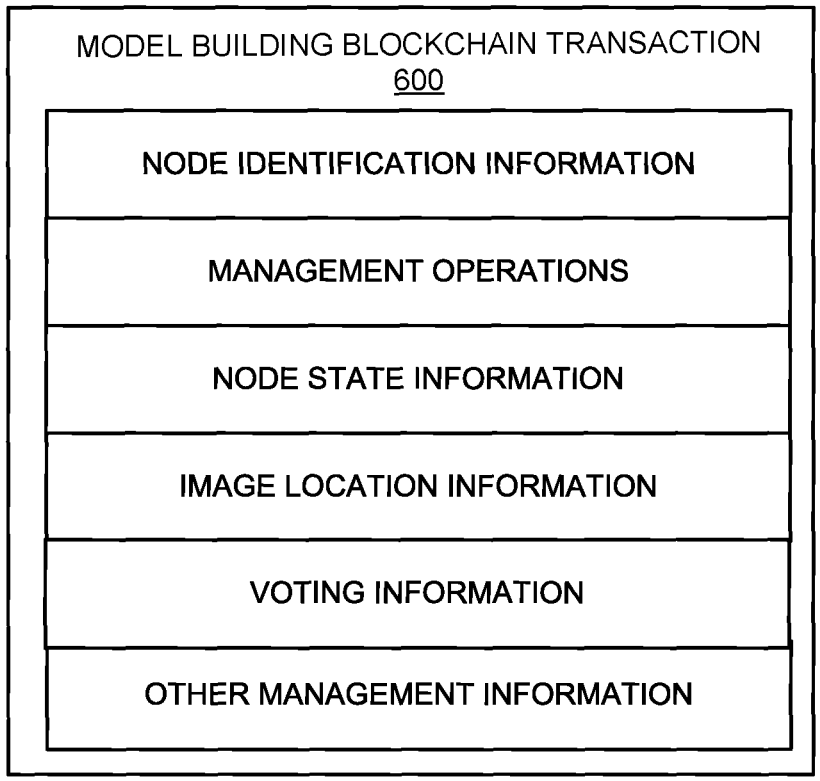
FIG. 6 illustrates an example of a transaction for inclusion in a block entry of a distributed ledger that includes information for decentralized management of nodes under the control of different entities, according to an implementation of the invention.

FIG. 6 illustrates an example of a management blockchain transaction 600 (also referred to as "transaction 600"), according to an implementation of the invention. Transaction 600 may include node identification information, management operations information, node state information, node state information, image location information, voting information, and/or other transaction information.

The node identification information may include an identification of a node that provided the transaction 600. The management operations information may identify one or more management operations to be performed. For instance, a management node 12 may have written the management operations to be performed not only to issue a change request to edge nodes 10 but also document the current state of the system. The node state information may include information that indicates a state of a node that generated the transaction. The image location information may include a location of where or otherwise how to obtain image or other data to complete the management operations. For example, if a management operation includes a change request to update to a new version of software, the location of such software may be encoded in the image location information. In some instances, to the extent that the update is below a threshold size, the image location information may include the update itself. The voting information may indicate votes made by one or more nodes 10 in relation to whether or not a management operation should be adopted by the network. Other transaction information, such as a timestamp of when the transaction was created, may be stored as well.

Although illustrated in FIG. 1 as a single component, a node 10 may include a plurality of individual components (such as computer devices) each programmed with at least some of the functions described herein. The one or more processors 20 may each include one or more physical processors that are programmed by computer program instructions. The various instructions described herein are provided for illustrative purposes. Other configurations and numbers of instructions may be used, so long as the processor(s) 20 are programmed to perform the functions described herein.

Furthermore, it should be appreciated that although the various instructions are illustrated in FIG. 1 as being co-located within a single processing unit, in implementations in which processor(s) 20 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 20 may be programmed by one or more additional instructions that may perform some or all of the functionality attributed herein to one of the instructions.

The various instructions described herein may be stored in a storage device 40, which may comprise random access memory (RAM), read only memory (ROM), and/or other memory. The storage device may store the computer program instructions (such as the aforementioned instructions) to be executed by processor 20 as well as data that may be manipulated by processor 20. The storage device may comprise one or more non-transitory machine-readable storage media such as floppy disks, hard disks, optical disks, tapes, or other physical storage media for storing computer-executable instructions and/or data.

The distributed ledger 42, transaction queue, smart contracts 44, management operations to be performed, and/or other information described herein may be stored in various storage devices such as storage device 40. Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The nodes 10 illustrated in FIG. 1 may be coupled to other nodes via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing figures, different numbers of entities than those depicted may be used. Furthermore, according to various implementations, the components described herein may be implemented in hardware and/or software that configure hardware.

The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A decentralized management system for a blockchain network, comprising:
    a first node of the blockchain network, wherein the first node includes a processor and instructions programming the processor to cause the first node to:
    enroll with the blockchain network to participate in management of the blockchain network;
    receive a blockchain transaction with a change request proposed by a second node of the blockchain network;
    determine a vote of whether to approve the change request;
    transmit the vote to the blockchain network in a blockchain transaction, wherein at least a third node of the blockchain network provides a vote on whether to approve the change request; and
    determine that the change request is approved;
    implement the change request on the first node; and
    generate a blockchain transaction comprising a payload that indicates a state of the first node after implementing the change request.

2. The system of claim 1, wherein to determine that the change request is approved, the first node is programmed to:
    determine a consensus decision that the change request is approved based on the vote and the vote from the third node.

3. The system of claim 1, wherein to determine that the change request is approved, the first node is programmed to:
    read, from a ledger block from a local copy of a distributed ledger of the blockchain network, a consensus decision that the change request is approved.

4. The system of claim 1, wherein to determine the vote, the first node is programmed to:
    obtain a local copy of a smart contract previously agreed to by nodes of the blockchain network.

5. The system of claim 1, wherein to determine the vote, the first node is programmed to: consult a local policy to determine whether the change request violates the local policy.

6. The system of claim 1, wherein to transmit the vote, the first node is programmed to transmit the blockchain transaction to at least one other node of the blockchain network.

7. The system of claim 1, wherein to implement the change request, the first node is programmed to implement the change request in accordance with a smart contract previously agreed to by nodes of the blockchain network.

8. A method of decentralized management of a blockchain network, comprising:
    enrolling, by a first node of the blockchain network, with the blockchain network to participate in management of the blockchain network;
    receiving, by the first node, a blockchain transaction with a change request proposed by a second node of the blockchain network;
    determining, by the first node, a vote of whether to approve the change request;
    transmitting, by the first node, the vote to the blockchain network in a blockchain transaction, wherein at least a third node of the blockchain network provides a respective vote on the whether to approve the change request;
    determining, by the first node, that the change request is approved;
    implementing, by the first node, the change request; and
    generating, by the first node, a blockchain transaction comprising a payload that indicates a state of the first node after implementing the change request.

9. The method of claim 8, wherein determining that the change request is approved comprises:
    determining, by the first node, a consensus decision that the change request is approved based on the vote and the respective vote.

10. The method of claim 8, wherein determining that the change request is approved comprises: reading, by the first node, from a ledger block from a local copy of a distributed ledger of the blockchain network, a consensus decision that the change request is approved.

11. The method of claim 8, wherein determining the vote comprises: obtaining, by the first node, a local copy of a smart contract previously agreed to by nodes of the blockchain network.

12. The method of claim 8, wherein determining the vote comprises, consulting, by the first node, a local policy to determine whether the change request violates the local policy.

13. The method of claim 8, wherein transmitting the vote comprises: transmitting, by the first node, the blockchain transaction to at least one other node of the blockchain network.

14. A non-transitory machine-readable storage medium comprising instructions executable by a processor a first node of a blockchain network, the instructions programming the processor to:
    enroll with the blockchain network to participate in management of the blockchain network;
    receive a blockchain transaction with a change request proposed by a second node of the blockchain network;
    determine a vote of whether to approve the change request;
    transmit the vote to the blockchain network in a blockchain transaction, wherein at least a third node of the blockchain network provides a vote on whether to approve the change request; and
    determine that the change request is approved;
    implement the change request on the first node; and
    generate a blockchain transaction comprising a payload that indicates a state of the first node after implementing the change request.

15. The non-transitory machine-readable storage medium of claim 14, wherein the instructions to determine that the change request is approved comprises instructions to determine a consensus decision that the change request is approved based on the vote and the vote from the third node.

16. The non-transitory machine-readable storage medium of claim 14, wherein the instructions to determine that the change request is approved comprises instructions to read, from a ledger block from a local copy of a distributed ledger of the blockchain network, a consensus decision that the change request is approved.

17. The non-transitory machine-readable storage medium of claim 14, wherein the instructions to determine the vote comprises instructions to obtain a local copy of a smart contract previously agreed to by nodes of the blockchain network.

18. The non-transitory machine-readable storage medium of claim 14, wherein the instructions to determine the vote comprises instructions to consult a local policy to determine whether the change request violates the local policy.

19. The non-transitory machine-readable storage medium of claim 14, wherein the instructions to transmit the vote comprises instructions to transmit the blockchain transaction to at least one other node of the blockchain network.

20. The non-transitory machine-readable storage medium of claim 14, wherein the instructions to implement the change request comprise instructions to implement the change request in accordance with a smart contract previously agreed to by nodes of the blockchain network.

\* \* \* \* \*